(12) United States Patent
Nilsson et al.

(10) Patent No.: US 7,131,325 B2
(45) Date of Patent: Nov. 7, 2006

(54) RADAR LEVEL GAUGE SYSTEM WITH INTERMITTENT AMPLIFICATION

(75) Inventors: Valter Nilsson, Hovås (SE); Niklas Penndal, Jönköping (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/882,649

(22) Filed: Jul. 1, 2004

(65) Prior Publication Data

US 2006/0000275 A1    Jan. 5, 2006

(51) Int. Cl.
*G01F 23/00*    (2006.01)
*G01F 23/28*    (2006.01)

(52) U.S. Cl. .................... 73/290 V; 73/290 R
(58) Field of Classification Search ............ 73/290 V, 73/290 R; 342/124
See application file for complete search history.

(56) References Cited

U.S. PATENT DOCUMENTS

| | | | | |
|---|---|---|---|---|
| 5,076,384 | A * | 12/1991 | Wada et al. | 180/169 |
| 5,369,409 | A | 11/1994 | Urabe et al. | 342/133 |
| 6,014,100 | A | 1/2000 | Fehrenbach et al. | 342/124 |
| 6,198,425 | B1 * | 3/2001 | Nastronero | 342/68 |
| 6,535,161 | B1 | 3/2003 | McEwan | 342/124 |
| 2005/0168379 | A1 * | 8/2005 | Griessbaum et al. | 342/124 |

OTHER PUBLICATIONS

U.S. Appl. No. 60/542,066, Griessbaum et al., filed Feb. 4, 2004, whole document used to establish priority for the PG Publication of U.S. Appl. No. 11/039,443.*
International Search Report for PCT/SE2005/001039.

* cited by examiner

*Primary Examiner*—Hezron Williams
*Assistant Examiner*—Rodney Frank
(74) *Attorney, Agent, or Firm*—Westman, Champlin & Kelly, P.A.

(57) ABSTRACT

A radar level gauge system is disclosed, comprising: a transmitter for transmitting pulsed measuring signals into a tank; a receiver for receiving echo signals from the tank; and processing circuitry for processing the received echo signals, said processing means including an amplifier for amplification of the received echo signals. Further, the amplifier is operable in a high and a low amplification mode, and the processing circuitry is arranged to control the amplifier intermittently in order to be in the high amplification mode only during certain time slots. By intermittently operating the amplifier in a low amplification mode, providing only a low or moderate amplification, or preferably being shut off (i.e. with essentially no amplification), the power required for the amplification could be significantly reduced. Further, the noise generated by the amplifier could be significantly reduced.

A corresponding processing circuitry and operating method are also disclosed.

19 Claims, 3 Drawing Sheets

$t_d$: 50-50% of amplitude
$t_p$: 50-50% of amplitude
tr: 10-90% of amplitude
$t_f$: 90-10% of amplitude

RADAR LEVEL GAUGE SYSTEM WITH INTERMITTENT AMPLIFICATION

FIELD OF THE INVENTION

The present invention relates to a radar level gauge system for determining the filling level of a filling material in a tank. Such a system could comprise a transmitter for emitting measuring signals towards the surface of the filling material; a receiver for receiving echo signals from the tank; and processing circuitry for determining the filling level of the tank based on said echo signal. Further, the invention also relates to a corresponding processing circuitry, and a method for determining the filling level of a filling material in a tank.

BACKGROUND OF THE INVENTION

Radar level gauges are in wide use for making non-contact measurements of the level of products such as process fluids, granular compounds and other materials. These devices utilize antennas to transmit electromagnetic waves toward the material being monitored and to receive electromagnetic echoes which are reflected at the surface of the material being monitored.

However, a problem experienced in this type of level gauges is that the signal strength from a surface echo reduces significantly as a function of measured distance. In order to increase the signal strength of the received echo signal, an amplifier is typically used.

However, a common problem in systems using such amplification is that the amplifier normally requires much power. The provision of this power is relatively difficult to achieve in practice, since energy is normally a scarce resource in the above-discussed type of gauge systems. In particular, this is a problem in systems using a two wire feeding system.

Still further, most known systems have problems related to the noise level, due to the increased noise level generated by the amplification and the amplifier.

SUMMARY OF THE INVENTION

It is therefore an object of the present invention to provide a radar level gauge system, a processing circuitry for use in such a radar level gauge system and a method of determining the filling level of a filling material, which at least partly alleviate the above-discussed problems of the prior art.

This object is achieved with a radar level gauge system, a processing circuitry and a method according to the appended claims.

According to one aspect of the invention, there is provided a radar level gauge system comprising: a transmitter for transmitting pulsed measuring signals into a tank; a receiver for receiving echo signals from the tank; and processing circuitry for processing the received echo signals, said processing means including an amplifier for amplification of the received echo signals; wherein the amplifier is operable in a high and a low amplification mode, and wherein the processing circuitry is arranged to control the amplifier intermittently in order to be in the high amplification mode only during certain time slots.

By intermittently operating the amplifier in a low amplification mode, providing only a low or moderate amplification, or preferably being shut off (i.e. with essentially no amplification), the power required for the amplification could be significantly reduced. Further, the noise generated by the amplifier could be significantly reduced. The invention is based on the insight that in certain systems, the amplifier is not needed at certain time periods, and that great advantages could be achieved by having the amplifier operating in a low amplification mode, or being shut off, during such time periods.

The transmitter could preferably be adapted to emit pulsed signals, and wherein the processing circuitry could be adapted to determine a filling level of the tank based on the time between the emission of a pulsed signal and the reception of the echo of said signal.

The gauge system could be of the type in which the amplifier is arranged to amplify the echo signal before any other significant processing or manipulation of the signal.

The amplifier could be voltage controlled, wherein an input voltage control signal controls the operation of the amplifier to be in the low or high amplification mode. Such a voltage control makes the control of the amplifier relatively simple, and is also relatively cost-effective to implement.

The receiver for receiving echo signals from the tank could be arranged to operate intermittently, i.e. only to receive echo signals during certain reception time slots, wherein the processing circuitry could be arranged to control the amplifier intermittently in order to be in the high amplification mode essentially only during said reception time slots.

Alternatively or additionally, the processing circuitry could be arranged to process received echo signals only during certain processing time slots, wherein the processing circuitry could be arranged to control the amplifier intermittently in order to be in the high amplification mode essentially only during said processing time slots. In this case, the processing circuitry could be arranged to process the received echo signals by generating reference signals, and mixing said reference signals with the received echo signals, wherein at least one of the generation of the reference signals and the mixing of the signals is preferably performed only during said processing time slots.

The gauge system could use a two wire interface arranged both to transmit measurement data to a remote location and to receive power for operation of the system. Such a system could e.g. be a 20 mA system, and in such a system it is particularly important to restrict the power use as much as possible. Alternatively or additionally, the gauge system could comprises a temporary energy store for providing power for operation of the system, such as a battery or a capacitor. In such a system it is also of particular importance to restrict the power use as much as possible According to another aspect of the invention, there is provided a processing circuitry for use in a pulsed radar level gauge system comprising: a controllable amplification means for amplification of a received echo signal, wherein the amplification means is operable in a high and a low amplification mode, and wherein the processing circuitry is arranged to control the amplification means intermittently in order to be in the high amplification mode only during certain time slots.

According to still another aspect of the invention, there is provided a radar level gauge system comprising: a transmission pulse generator for generating pulsed measuring signals to be transmitted into a tank; a receiver for receiving echo signals from the tank; an amplifier for amplifying the received echo signals; a reference pulse generator for generating pulsed reference signals; and a mixer for mixing the amplified received echo signals and the reference signals; wherein at least one of the reference pulse generator and the mixer is arranged to operate only during certain operative time slots, and wherein the amplifier is controllable to be switched off at least part of the time between said operative time slots.

By intermittently switching off the amplifier, the power required for the amplification could be significantly reduced. Further, the noise generated by the amplifier could be significantly reduced.

According to still another aspect of the invention, there is provided a method of determining the filling level of a filling material in a tank, comprising: transmitting pulsed measuring signals towards the surface of the filling material; receiving echo signals from the tank; amplifying the received echo signals; generating pulsed reference signals; and processing of the received echo signals and the generated reference signals in order to determine said filling level; wherein at least one of the steps of generating the reference signals and processing of the received echo signals and the generated reference signals is performed only during certain operative time slots, and wherein the amplification is controlled to be in a low amplification mode at least part of the time between said operative time slots.

This method could be used for operating the previously discussed radar level gauge system, and provides the same or similar advantages. By intermittently amplifying the received signals, the power required for the amplification could be significantly reduced. Further, the noise generated by the amplifier could be significantly reduced.

The step of amplifying the received echo signals could advantageously be performed before the processing of the received echo signals and the generated reference signals in order to determine the filling level.

Preferably, the amplification when controlled to be in the low amplification mode generates essentially no amplification, i.e. the amplifier providing the amplification is shut off.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
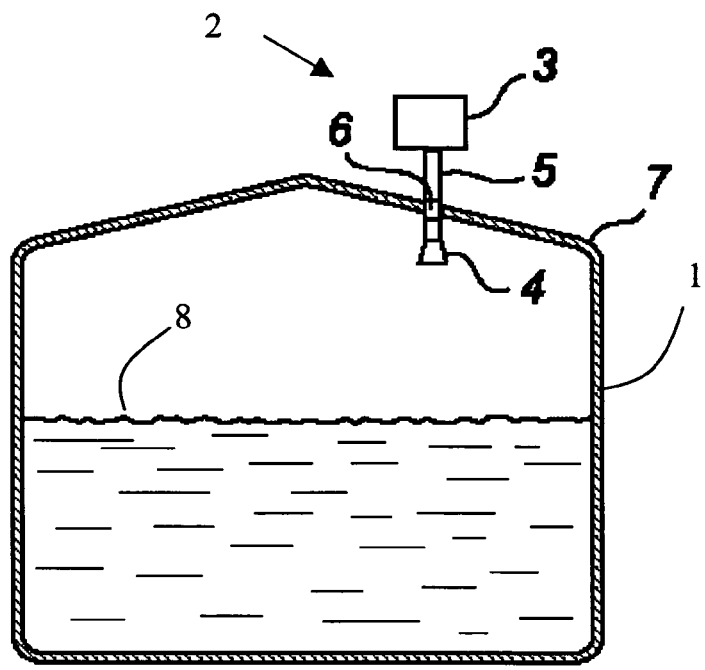
FIG. 1 is a schematic cross-sectional side view of a container, in which an antenna device according to the embodiment is arranged.

FIG. 1 shows schematically a tank 1 provided with a radar level gauge system 2. In brief, the system in FIG. 1 comprises an electronic unit 3 for transmitting and receiving radar signals and processing the received signals in order to determine the level in the tank, an antenna 4 arranged inside the tank for transmitting and receiving radar waves into the tank, and a radar wave guide assembly 5 for guiding signals between the electronic unit 3 and the antenna 4. In order to maintain temperature and pressure in the tank, and to protect the outside environment from the tank contents, a wave guide sealing 6 is arranged close to where the wave guide 5 passes through the tank wall 7 to provide sealing of the tank 1. The same antenna could preferably be used both as a transmitter for emitting the output radiation and as a receiver for receiving the reflected echo signal, even though it is also possible to use separate antennas for these functions.

In use, the radar level gauge 2 transmits radar energy along the waveguide, 5 through the tank roof port and receives reflected energy from the liquid surface 8 to provide an indication of the level of the liquid within the tank. The radar level gauge 2 could be coupled to a remote location (for example a control room) via a signal wire or the like.

The system uses pulsed emitted radiation. For example, the system may be a so called TDR (Time Domain Reflectometry) system. For such systems the transit time for the pulsed signals before returning as echo signals are used for measuring the level in the container or tank. This may be accomplished by a direct measurement of the time difference between the emission of the pulsed signal and the subsequent reception of the echo signal. The measured travel time could then be used for calculation of the travel distance, and the distance between the antenna and the reflecting surface.

However, when high speed propagating signals are used, it is often advantageous to use an indirect measurement of the transit time for the pulsed signals before returning as echo signals. For example, it is possible to measure reflected signals only during a predetermined time slot. Such a time slot typically has a defined start time A and stop time B, both A and B being certain time periods after the emission of the pulsed signal. If a reflected signal is received during the duration of said time slot, it means that the transit time is in the range A to B, and if a reflected signal is not received during said time slot, it implies that the transit time is outside said time range. By displacing the time slot in time, that is changing the values A and B between different slots, it is possible to determine the transit time with very high precision and accuracy, even when high speed propagating signals are used. This type of system is often known as using time expansion achieved by using repetitive sequential sampling, or simply as a sequential sampling system. The same sequential sampling principal is per se also used in sampling oscilloscopes.

Figure 2:
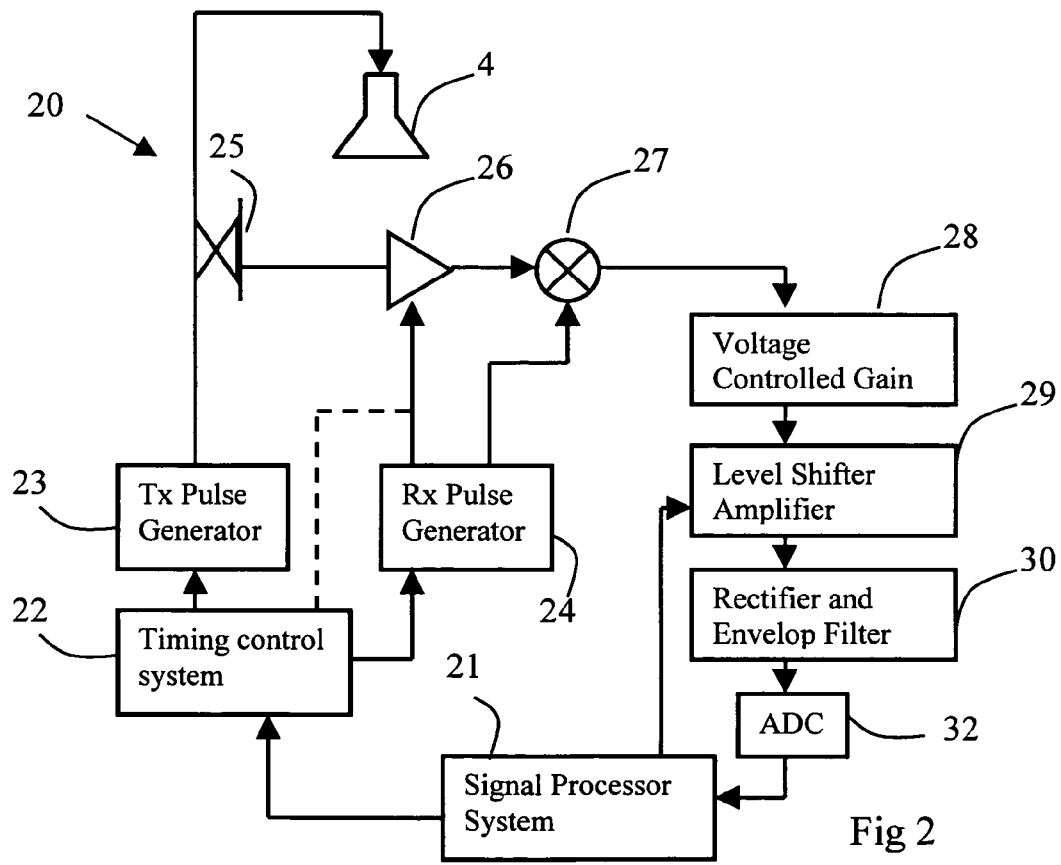
FIG. 2 is a schematic block diagram illustrating a radar level gauging system according to an embodiment according to the invention.
Figure 3:
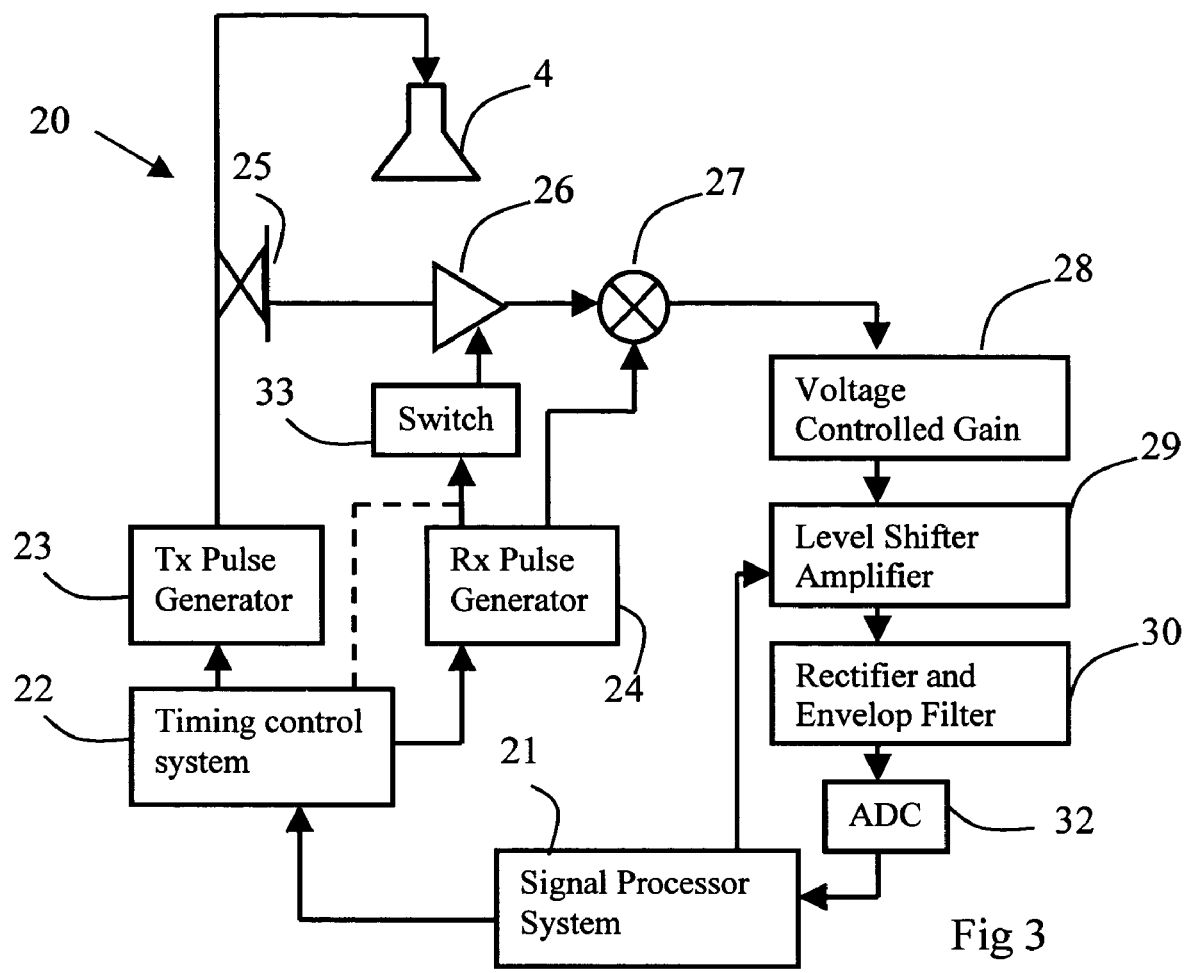
FIG. 3 is a schematic block diagram illustrating a radar level gauging system according to a second embodiment according to the invention.

A processing circuitry 20 to be used in a radar level gauge system as discussed generally above is schematically illustrated in FIGS. 2 and 3.

In the embodiment shown in FIG. 2, circuitry 20 includes a signal processor 21, a timing control system 22, a Tx pulse generator 23 and a Rx pulse generator 24. The signal processor 21 controls the timing control system, which in turns controls the Tx and Rx pulse generators. The Tx pulse generator 23 generates pulsed radiation for emission into the tank, whereas the Rx pulse generator 24 generates a reference pulse to be used for calculation of the time difference between the pulses, subsequently to be used in the estimate of the filling level of the tank. The reflected Tx pulse, in this application generally referred to as the echo signal, is received by the antenna 4, and through a directional coupler 25 forwarded to an amplifier 26. In the mixer 27, the amplified echo signal and the Rx signal from the Rx pulse generator 24 are mixed, in order to generate an output signal indicative on the time difference between the pulses.

Figure 5:
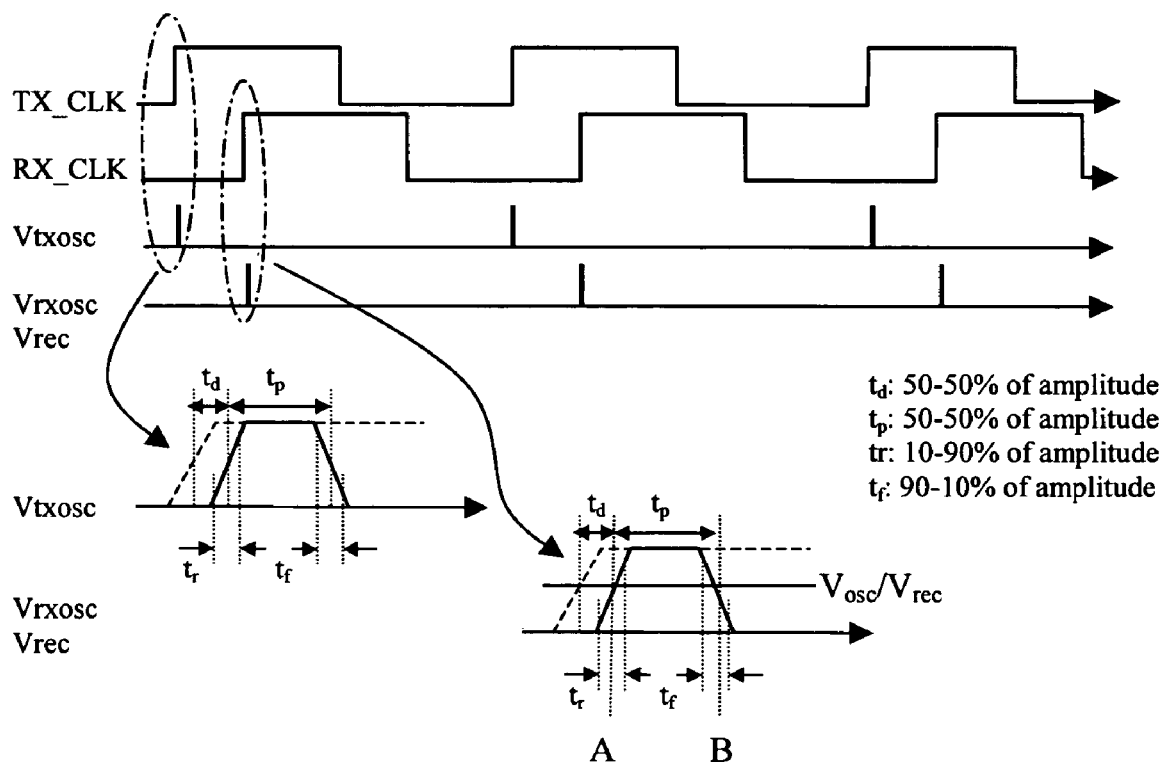
FIG. 5 is a timing diagram illustrating the timely relationship between different signals according to an embodiment of the invention.

In a system using predetermined time slots A–B for measurement of a received echo signal, as discussed above, the Tx and Rx pulse generators could be operated in the way schematically illustrated in the timing diagram of FIG. 5. The timing control system 22 provides a clock signal, TX_CLK, to the Tx pulse generator 23, and as a result of this input clock signal, the Tx pulse generator generates a pulsed output signal, Vtxosc for transmitting a pulse through the transmitter 4. The pulses of Vtxosc typically has an up and down ramp, as is illustrated in the enlarged part of FIG. 5. Further, the timing control system 22 also provides a clock signal, RX_CLK, to the Rx pulse generator 24. This Rx clock signal is timely displaced from the Tx clock signal with a delay, and the delay time is preferably controllable in order to enable the receiving time slot to be controllable. As a result of this input clock signal, the Rx pulse generator generates a pulsed output signal, Vrxosc, to be provided as a reference signal to the mixer 27. Accordingly, an echo signal received from the receiver 4 could only be processed if it is received during the time slot when the Rx pulse signal is applied to the mixer. The pulses of Vrxosc typically has a similar ramp shape as the Vtxosc, as is also illustrated in the enlarged part of FIG. 5.

The signal processor 21 is preferably a digital signal processor. In case the signal processor is digital, a DAC could be provided to convert outgoing digital signals to analog, and a ADC could be provided to convert incoming analog signals to digital.

The mixed signal is provided to a voltage controlled gain amplifier 28, a level shifter amplifier 29 and a rectifier and envelop filter 30, for signal processing.

The signal processor 21 is preferably a microprocessor based circuit adapted to receive the incoming signal, as discussed above, and provide as an output a signal or information indicative of the level of material 8. The functions and algorithms implemented by signal processor 110, some of which can be embodied in hardware and some of which can be embodied in software, are per se known from the art will not be discussed further in this application.

The amplifier 26 for amplification of the received reflected echo signal is further arranged to operate intermittently. The amplifier is operable in a high and a low amplification mode, and controllable to be in the high amplification mode only during certain time slots, and the rest of the time in the low amplification mode. The low amplification mode corresponds to essentially no amplification, and e.g. the amplifier could be switched off when in the low amplification mode.

Figure 4:
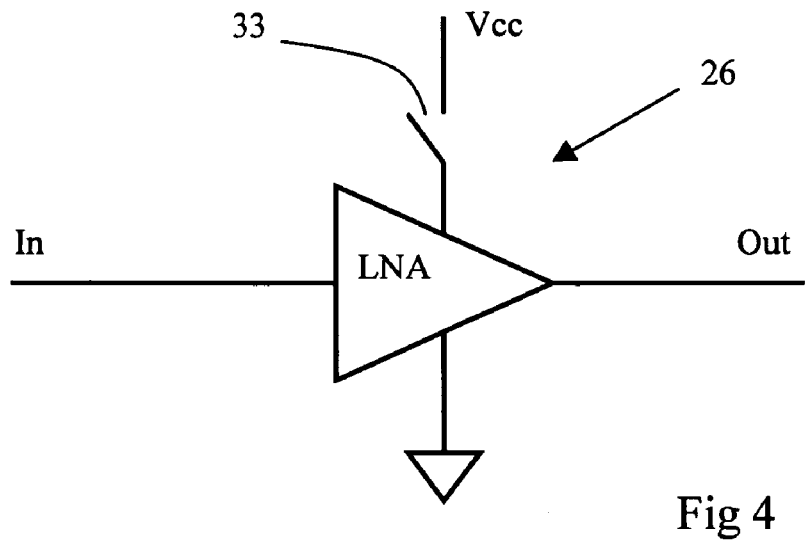
FIG. 4 is a schematic diagram illustrating an amplifier which could be used in the embodiments of FIG. 2 or FIG. 3.

The amplifier could be voltage controlled. Such an amplifier 26 is illustrated in more detail in FIG. 4. Hereby, the input voltage could be controlled in order to control the amplification gain of the amplifier, and to operate the amplifier in the high and low amplification mode, respectively. Alternatively, or additionally, a controllable switch 33 could be provided for controlling the input voltage to the amplifier. In principle, any amplifier with controllable gain could be used. However, preferably a fast amplifier, i.e. an amplifier with relative short response time, is used. For example, the amplifier could be a Low Noise Amplifier (LNA) comprising one or several discrete FETs, a bi-polar amplifier or an operational (OP) amplifier.

In the embodiment of FIG. 2, an amplifier 26 which is controllable directly by an input signal is illustrated, whereas FIG. 3 illustrates an embodiment in which a controllable switch 33 is provided to modify the input signal to the amplifier.

The intermittently operable amplifier could be used in any radar level gauge system in which it is possible to determine certain time periods in which an echo signal may be received and/or when the processing circuitry is operative to process the received signal, and certain time periods when this is not the case. Hereby, it becomes possible to operate the amplifier in the high amplification mode only during said time periods when an echo signal may be expected and/or processed, and to operate the amplifier in the low amplification mode, or even having it shut off, at least part of the time during other time periods.

The control signal for direct or indirect control of the amplifier 26 is preferably provided by the processing circuitry, and e.g. by the timing control system 22 (dashed lines) or by the RX pulse generator 24 (full lines), as is schematically illustrated in FIGS. 2 and 3. Hereby, the amplifier may be controlled to be in the high amplification mode essentially only when a reference signal is sent by the RX pulse generator 24 to the mixer 27.

If the amplifier response is fast enough, the Vrxosc signal provided by the Rx pulse generator 24 could be used directly as a control signal Vcc for controlling the amplification mode of the amplifier 26. Hereby, the amplifier is automatically activated to the high amplification mode simultaneously with the provision of a reference (Rx) signal to the mixer 27. However, it is also feasible to use a modified Vrxosc signal as the Vcc signal. For example, the start and stop ramps of the Vcc signals may be adjusted to be slightly before or after the corresponding ramps of the Vrxosc signal. Further, it is also feasible to generate a Vcc signal directly based on the Tx clock signal and/or the Rx clock signal provided by the timing control system 22. Other ways of providing an adequate control of the amplifier are also feasible.

The frequency of the clock signals (Tx clock and Rx clock) could for example be 2 MHz. The time slots used for receiving signals, i.e. the duration of the Rx pulse, could typically be in the range 0.5–5 nanoseconds, and preferably in the range 1–3 ns, and most preferably in the range 1.5–2 ns. The response time for the amplifier, i.e. the time for bringing the amplifier from the low amplification mode to the high amplification mode, is preferably much smaller than said time slot duration. For example, a suitable amplification response time could be less than 1 nanosecond, and preferably less than 750 picoseconds, and most preferably less than 600 ps. Typically, it could be advantageous with a amplifier response time of 500–600 ps.

In an example with a 2 MHz operating frequency, and with a time slot duration of about 2 ns, the amplifier will be in the high operation mode less than 0.5% of the time when the system is in use. This means that the amplifier will need power essentially only under 0.5% of the time when in use, and also that it will only be generating noise to the system during such a very limited time. For an amplifier operated continuously, i.e. without the intermittent operation as discussed above, at 20 mA and 2.0 V, the power consumption will be about 40 mW. When the same amplifier is operated intermittently as discussed above, the power consumption will be less than 1.3 mW.

The amplification device and amplification scheme as discussed above is very well suited for use in radar level gauge systems. However, it could also be used for other applications in which an intermittently received signal is to be amplified, and when the time period when the reception of the signal is likely to occur or when a received signal needs to be amplified, is at least to some extent predictable.

The control of the amplifier could be accomplished by adequate hardware components or software control, such as embedded software in the timing control system 22.

In the embodiments discussed above, the controllable amplifier 26 is arranged before the mixer 27, and the amplification of the received signal is made before any other processing of the signal. However, it is also possible to provide the controllable amplifier 26 after the mixer 27.

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, the proposed amplification control may be used in different types of level gauge systems. Such and other obvious modifications must be considered to be within the scope of the present invention, as it is defined by the appended claims.

What is claimed is:

1. A radar level gauge system comprising:
    a transmitter for transmitting pulsed measuring signals into a tank;
    a receiver for receiving echo signals from the tank; and
    processing circuitry for processing the received echo signals, said processing means including an amplifier for amplification of the received echo signals, wherein the amplifier is operable in a high and a low amplification mode, and wherein the processing circuitry is arranged to control the amplifier intermittently in order to be in the high amplification mode only during certain time slots within an active radar level gauging period for the system.

2. The gauge system of claim 1, wherein the transmitter is adapted to emit pulsed signals, and wherein the processing circuitry is adapted to determine a filling level of the tank based on the time between the emission of a pulsed signal and the reception of the echo of said signal.

3. The gauge system of claim 1, wherein the amplifier is arranged to amplify the echo signal before any other significant processing or manipulation of the signal.

4. The gauge system of claim 1, wherein the amplifier during the low amplification mode generates essentially no amplification.

5. The gauge system of claim 1, wherein the amplifier is voltage controlled, wherein an input voltage control signal controls the operation of the amplifier to be in the low or high amplification mode.

6. The gauge system of claim 1, wherein the receiver for receiving echo signals from the tank is arranged to operate intermittently, only to receive echo signals during certain reception time slots, wherein the processing circuitry is arranged to control the amplifier intermittently in order to be in the high amplification mode essentially only during said reception time slots.

7. The gauge system of claim 1, wherein the processing circuitry is arranged to process received echo signals only during certain processing time slots, wherein the processing circuitry is arranged to control the amplifier intermittently in order to be in the high amplification mode essentially only during said processing time slots.

8. The gauge system of claim 7, wherein the processing circuitry is arranged to process the received echo signals by generating reference signals, and mixing said reference signals with the received echo signals, wherein at least one of the generation of the reference signals and the mixing of the signals is performed only during said processing time slots.

9. The gauge system of claim 1, wherein it comprises a two wire interface arranged both to transmit measurement data to a remote location and to receive power for operation of the system.

10. The gauge system of claim 1, wherein it further comprises a temporary energy store for providing power for operation of the system.

11. A processing circuitry for use in a pulsed radar level gauge system comprising:
    a controllable amplification means for amplification of a received echo signal, wherein the amplification means is operable in a high and a low amplification mode, and wherein the processing circuitry is arranged to control the amplification means intermittently in order to be in the high amplification mode only during certain time slots within an active radar level gauging period for the system.

12. A radar level gauge system comprising:
    a transmission pulse generator for generating pulsed measuring signals to be transmitted into a tank;
    a receiver for receiving echo signals from the tank;
    an amplifier for amplifying the received echo signals;
    a reference pulse generator for generating pulsed reference signals; and
    a mixer for mixing the amplified received echo signals and the reference signals;
    wherein at least one of the reference pulse generator and the mixer is arranged to operate only during certain operative time slots within an active radar level gauging period for the system, and wherein the amplifier is controllable to be switched off at least part of the time between said operative time slots.

13. The gauge system of claim 12, wherein the amplifier is arranged to amplify the echo signal before any other significant processing or manipulation of the signal.

14. The gauge system of claim 12, wherein the amplifier is voltage controlled, wherein an input voltage control signal controls the operation of the amplifier to be switched on or off.

15. The gauge system of claim 12, wherein it comprises a two wire interface arranged both to transmit measurement data to a remote location and to receive power for operation of the system.

16. The gauge system of claim 12, wherein it further comprises a temporary energy store for providing power for operation of the system.

17. A method of determining the filling level of a filling material in a tank, comprising:
    transmitting pulsed measuring signals towards the surface of the filling material;
    receiving echo signals from the tank;
    amplifying the received echo signals;
    generating pulsed reference signals; and
    processing of the received echo signals and the generated reference signals in order to determine said filling level;
    wherein at least one of the steps of generating the reference signals and processing of the received echo signals and the generated reference signals is performed only during certain operative time slots within an active radar level gauging period, and wherein the amplification is controlled to be in a low amplification mode at least part of the time between said operative time slots.

18. The method of claim 17, wherein step of amplifying the received echo signals is performed before the processing of the received echo signals and the generated reference signals in order to determine the filling level.

19. The method of claim 17, wherein the amplification when controlled to be in the low amplification mode generates essentially no amplification.

* * * * *